(12) United States Patent
Yang et al.

(10) Patent No.: US 12,247,477 B2
(45) Date of Patent: Mar. 11, 2025

(54) IMAGE BASED STICK SLIP CORRECTION OF LOGGING WHILE DRILLING IMAGES

(71) Applicant: Schlumberger Technology Corporation, Sugar Land, TX (US)

(72) Inventors: Shiduo Yang, Clamart (FR); Alexis He, Clamart (FR); Tianhua Zhang, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/719,991

(22) PCT Filed: May 31, 2023

(86) PCT No.: PCT/US2023/023931
§ 371 (c)(1),
(2) Date: Jun. 14, 2024

(87) PCT Pub. No.: WO2023/235357
PCT Pub. Date: Dec. 7, 2023

(65) Prior Publication Data
US 2024/0418075 A1    Dec. 19, 2024

(30) Foreign Application Priority Data
May 31, 2022  (EP) .................................. 22305795

(51) Int. Cl.
*G06T 7/00* (2017.01)
*E21B 47/002* (2012.01)
*E21B 47/04* (2012.01)
*G06T 11/00* (2006.01)

(52) U.S. Cl.
CPC .......... *E21B 47/0025* (2020.05); *E21B 47/04* (2013.01); *G06T 7/0004* (2013.01); *G06T 11/005* (2013.01); *E21B 2200/22* (2020.05)

(58) Field of Classification Search
CPC .... G06T 7/0004; G06T 7/005; E21B 47/0025
USPC ........................................................ 382/109
See application file for complete search history.

(56) References Cited

U.S. PATENT DOCUMENTS

| 7,873,475 | B2 | 1/2011 | Van Os |
| 8,571,796 | B2 | 10/2013 | Van Os |
| 2004/0222019 | A1 | 11/2004 | Estes |
| 2013/0049982 | A1 | 2/2013 | Hartmann |

(Continued)

OTHER PUBLICATIONS

Search Report and Written Opinion of International Patent Application No. PCT/US2023/023931 dated Sep. 20, 2023, 8 pages.

(Continued)

*Primary Examiner* — Kenny A Cese
(74) *Attorney, Agent, or Firm* — Jeffrey D. Frantz

(57) ABSTRACT

A method for correcting an LWD image to remove stick slip features includes obtaining an LWD image in a wellbore. Surface depth measurements may be interpolated to obtain interpolated surface depths at selected ones of the depths in the LWD image and evaluated to obtain a first tool status log. The LWD image may be evaluated to obtain a second tool status log. The two status logs may be synchronized to obtain a synchronized log. A stick slip feature may be identified in the LWD image and the image resampled to remove the stick slip feature from the LWD image.

20 Claims, 7 Drawing Sheets

(56) References Cited

U.S. PATENT DOCUMENTS

2019/0345816 A1* 11/2019 Auchere ............... E21B 44/02
2020/0116005 A1   4/2020  Li
2021/0131208 A1   5/2021  Ludwig
2021/0293130 A1*  9/2021  Revheim ............... E21B 44/00

OTHER PUBLICATIONS

Zhu, X. et al., "A Literature Review of Approaches for Stick-Slip Vibration Suppression in Oilwell Drillstring", Advances in Mechanical Engineering, 2014, 6, pp. 17 pages.

* cited by examiner

IMAGE BASED STICK SLIP CORRECTION OF LOGGING WHILE DRILLING IMAGES

CROSS REFERENCE TO RELATED APPLICATIONS

This application is a National Stage Entry of International Application No. PCT/US2023/023931, which was filed on May 31, 2023, which claims priority to European Patent Application Ser. No. 22/305,795.1, which was filed on May 31, 2022, and is incorporated herein by reference in its entirety.

BACKGROUND

Severe dynamic conditions are often encountered while drilling subterranean wellbores (e.g., for oil and gas exploration and production). Stick slip is one such dynamic condition that refers to a torsional vibration that may be induced by friction between drill string components and the wellbore wall. Stick slip is known to produce instantaneous drill string rotation speeds many times that of the nominal rotation speed of the rotary table on the rig. In stick slip conditions a portion of the drill string or bit may stick to the wellbore wall due to frictional forces which may cause the drill string to temporarily stop rotating. Meanwhile, the rotary table continues to turn at the surface resulting in an accumulation of torsional energy in the drill string. When this torsional energy exceeds the static friction between the drill string (or bit) and the wellbore, the energy is released suddenly in a rapid burst of drill string rotation.

While severe stick slip is known to cause severe damage to downhole tools, as well as connection fatigue and excess wear to the drill bit and near-bit stabilizer blades, even moderate stick slip conditions are often problematic. For example, moderate stick slip conditions can degrade logging while drilling (LWD) images. Such degradation may include image discontinuities and visible slip features in high vertical resolution images. While stick slip conditions have been detected and quantified with dedicated dynamics sensor packages, there is a need to identify and remove stick slip features from LWD images.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

In one embodiment, a method for correcting an LWD image to remove stick slip features is disclosed. The method may include obtaining an LWD image in a wellbore. Surface depth measurements may be interpolated to obtain interpolated surface depths at selected ones of the depths in the LWD image and evaluated to obtain a first tool status log. The LWD image may be evaluated to obtain a second tool status log. The two status logs may be synchronized to obtain a synchronized log. A stick slip feature may be identified in the LWD image and the image resampled to remove the stick slip feature from the LWD image. The disclosed embodiments may advantageously remove stick slip artifacts from LWD images without the use of expensive hardware solutions.

Figure 1:
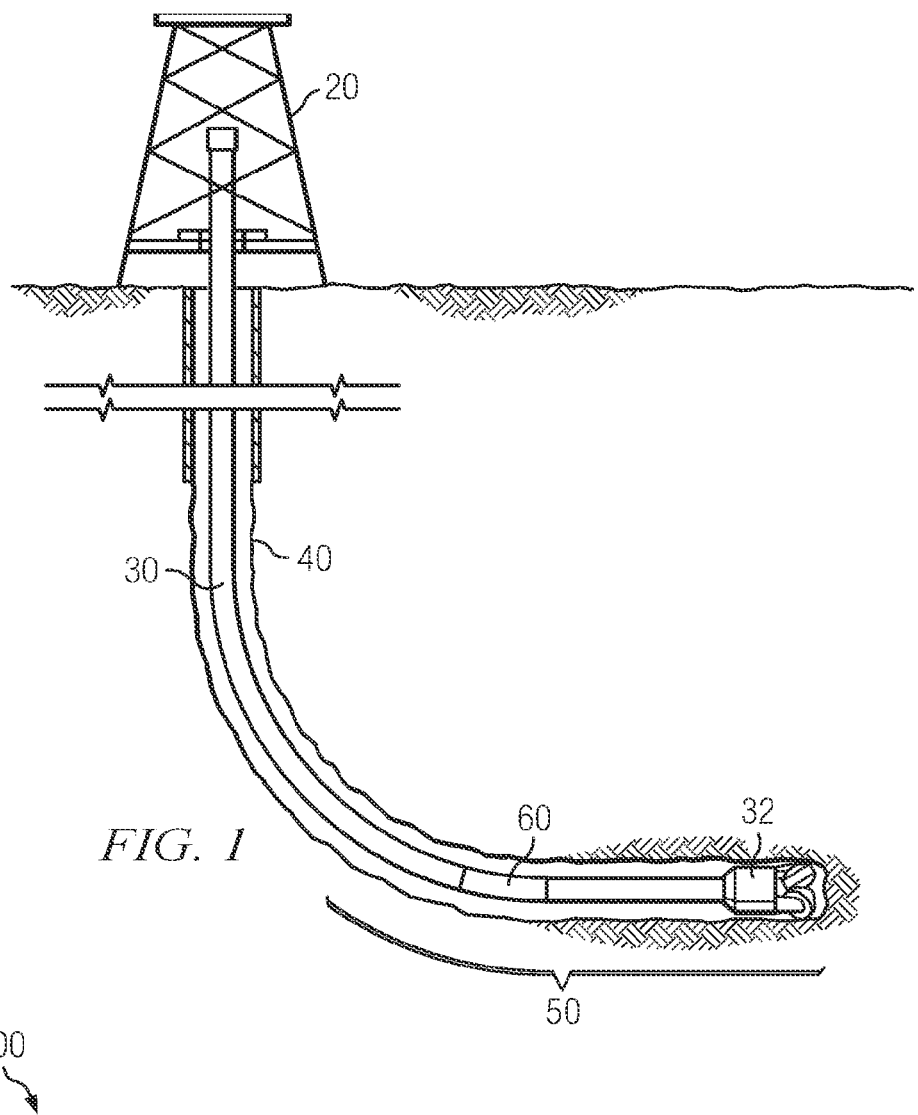
FIG. 1 depicts an example drilling rig suitable for making LWD measurements.

FIG. 1 depicts a schematic drilling rig 20 including a drill string 30 and an LWD tool 60 deployed in the string and disposed within a wellbore 40. The drilling rig 20 may be deployed in either onshore or offshore applications (an onshore application is depicted). In this type of system, the wellbore 40 may be formed in subsurface formations by rotary drilling in a manner that is well-known to those or ordinary skill in the art (e.g., via well-known directional drilling techniques).

As is known to those of ordinary skill, the drill string 30 may be rotated, for example, at the surface to drill the well (e.g., via a rotary table) or via a hydraulically powered motor deployed at the upper end of the bottom hole assembly (BHA) 50. A pump may deliver drilling fluid to the interior of the drill string 30 thereby causing the drilling fluid to flow downwardly through the drill string 30. The drilling fluid exits the drill string 30 via ports in a drill bit 32, and then circulates upwardly through the annular region between the outside of the drill string 30 and the wall of the wellbore 40. In this known manner, the drilling fluid lubricates the drill bit 32 and carries formation cuttings up to the surface.

In the illustrated embodiment, the LWD tool 60 may be deployed in the BHA 50 that may further optionally include, for example, a rotary steerable system (RSS), a motor, a measurement while drilling (MWD) tool, and/or one or more other logging-while-drilling (LWD) tools (none of which are shown). The LWD tool 60 may be configured to measure one or more properties of the formation through which the wellbore penetrates, for example, including resistivity, density, porosity, sonic or ultrasonic slowness, standoff, gamma ray counts, nuclear magnetic resonance relaxation times, and the like. The disclosed embodiments are not limited to any particular type of LWD tool provided that the tool enables LWD images to be obtained, however, may be particularly useful for ultrasonic and resistivity imaging applications.

The LWD tool 60 may be configured to generate LWD images while drilling (e.g., to collect LWD data while rotating in the wellbore during a drilling operation and to process the data to generate an image). In general, an LWD image may be thought of as a two-dimensional representation of an LWD measurement (e.g., a resistivity measurement or an ultrasonic measurement) at discrete azimuthal angles and borehole depths. Such borehole images thus convey the dependence of the measured formation (or borehole) parameter on the wellbore azimuth and measured depth. When forming an LWD image (such as a high resolution LWD image), timestamped LWD data may be mapped to discrete azimuth and depth values. Moreover, it will be appreciated that LWD data from several LWD tool rotations may be averaged to represent a single depth in the image. The disclosed embodiments are not limited to any particular LWD techniques or LWD imaging methodologies.

FIG. 1 further depicts an optional onsite operations or oilfield evaluation facility 80 (e.g., a control room or a field office). In the depicted embodiment, the facility 80 may include a system, such as a computer or computer system, for evaluating LWD images. The computer system may include one or more processors (e.g., microprocessors) which may be connected to one or more data storage devices (e.g., hard drives or solid-state memory) and user interfaces as well as to cloud-based storage or additional cloud-based processors. It will be further understood that the disclosed embodiments may include processor executable instructions stored in the data storage device. The executable instructions may be configured, for example, to execute methods 100 and 100' to evaluate LWD images and remove stick slip features from the images as described in more detail below with respect to FIGS. 2 and 3. It will of course be understood that the disclosed embodiments are not limited to the use of any particular computer hardware and/or software.

Figure 2:
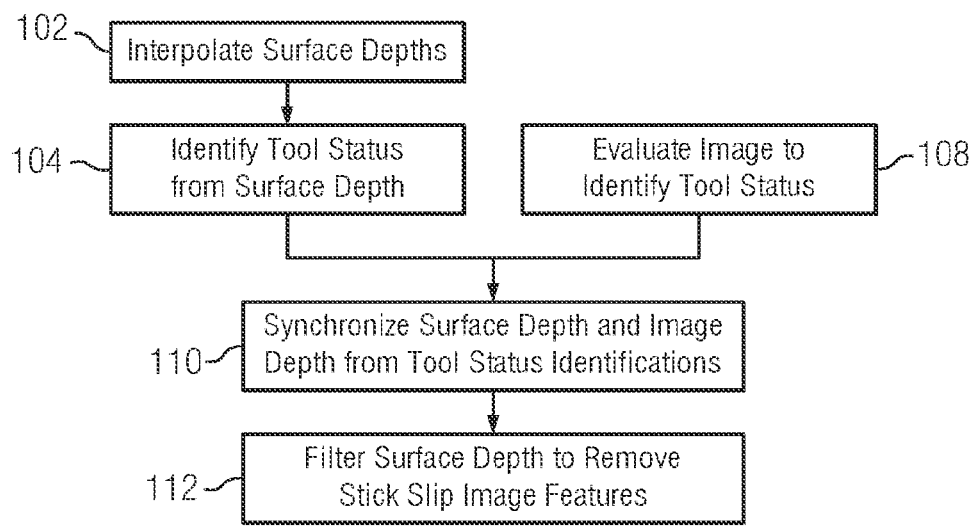
FIGS. 2 and 3 depict flow charts of one example method for correcting LWD images to remove stick slip features.
Figure 3:
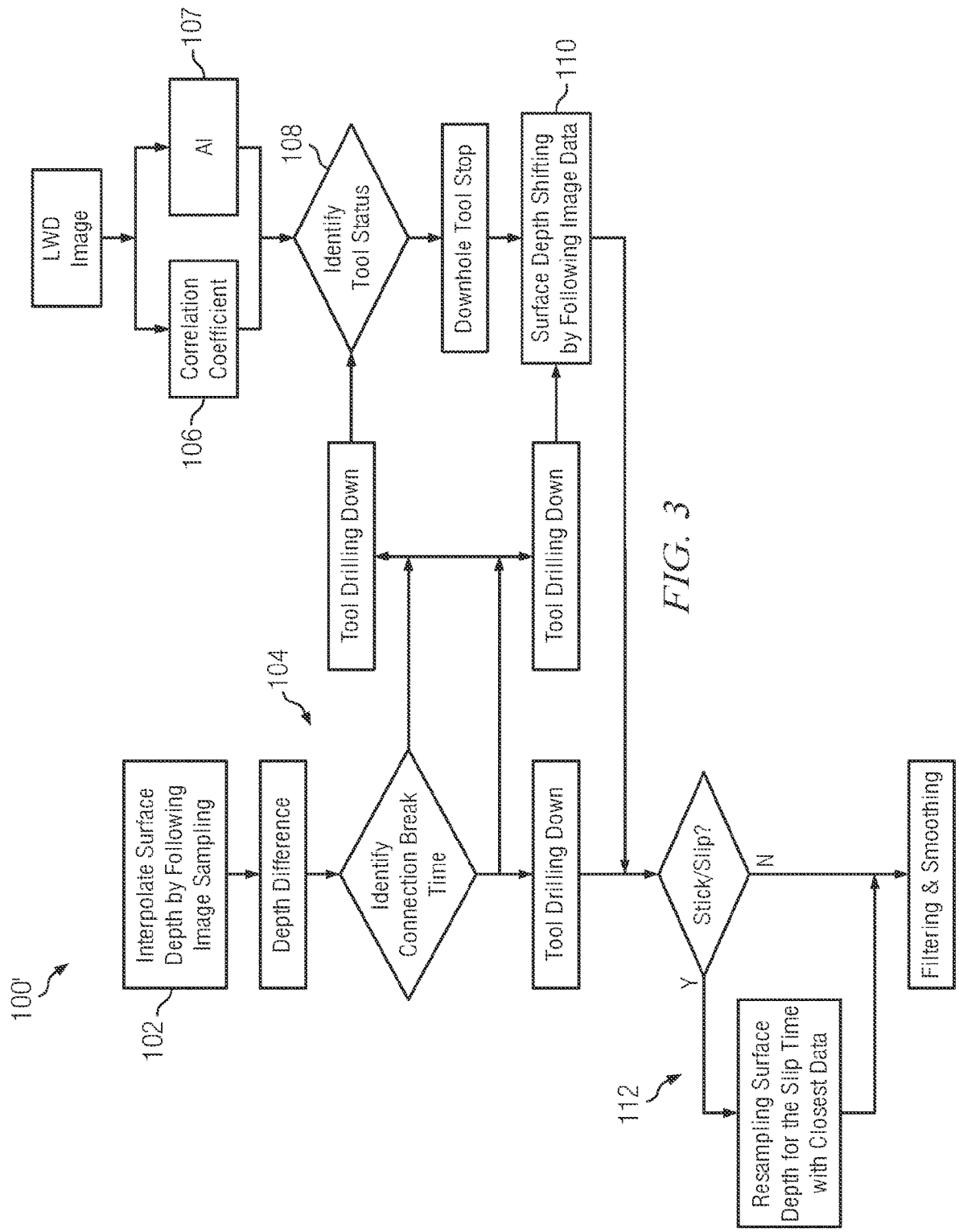

FIGS. 2 and 3 depict flow charts of example methods 100, 100' for correcting LWD images to remove stick slip features (with FIG. 3 depicted the method in more detail). Surface depths are computed for each of the depths in the image at 102. The surface depth is commonly recorded at some time interval while drilling using a depth measurement module at the surface (e.g., via recording the traveling block position at a time interval of approximately 1 min). It will be appreciated that the depth sampling rates are generally different at the surface and downhole. To accommodate for the different sampling rates, the surface depth measurements may be processed at 102 to obtain surface depth values corresponding to each depth (also referred to as a line or stripe) in the image. The surface depth values for each of the depths in the image may be obtained, for example, via interpolating the recorded surface depth measurements.

The interpolated surface depths may be evaluated at 104 to identify the tool status, for example, at each line or row in the image. The tool status may be identified at 104, for example, via computing depth differences at each of the interpolated surface depths (e.g., the surface depths of each line or depth in the image). For example, tool stop time intervals may be identified when the depth variation (the change in depth) between adjacent interpolated surface depths (e.g., adjacent depths or rows in the image) is less than a threshold or in some cases is approximately equal to 0. Tool stop time intervals (also referred to as drilling connection breakdown time intervals) may also be identified when the current downhole sensor depth is less than the maximum drilling depth. A tool pull out or tripping interval may be determined, for example when the depth variation between adjacent interpolated surface depths is negative and/or when the current downhole sensor depth is less than the maximum drilling depth. A tool drilling interval may be identified when the depth variation between adjacent interpolated surface depths is positive and/or when the current depth is about equal to the maximum depth.

The image data may also be evaluated at 108 to identify the tool status (e.g., at the same time or in parallel with the surface depth based identification at 104). For example, in one embodiment, a similarity (or correlation) may be computed at 106 (FIG. 3) from consecutive (adjacent) rows (depths) of image data indexed in time. A tool stop interval may be identified as having a very high similarity (or correlation) since when the tool is stopped the drill string is generally not rotating (or is rotating at the same depth). This causes successive measurements to be duplicated and have a high similarity (e.g., a correlation near unity).

With continued reference to FIGS. 2 and 3, definitive tool stop time intervals may be identified as being those that are identified by both the interpolated surface depth at 104 and image similarity at 108. Other indicated tool stop intervals may be discarded (i.e., when a tool stop time interval is indicated by only one of 104 or 108). It will be appreciated that although the definitive tool stop time intervals are identified at both 104 and 108, that the two identifications may not match exactly in starting time and duration. In other words, the evaluation at 104 and 108 may indicate different starting times and durations for a single stop time interval. The tool stop intervals may therefore be recomputed and synchronized to align their upper and lower depths and to enable the surface depths and image depths to be synchronized at 110. The stick slip depths may then be identified from the synchronized depth (or from the interpolated surface depths) when the depth variation is greater than a threshold such as the vertical resolution of the image. Image depths may then be recomputed (e.g., averaged) in the vicinity of the stick slip depth(s) to remove stick slip features from the image at 112.

With continued reference to FIGS. 2 and 3, the surface depth may be interpolated into the image dataset at 102. A surface depth variation (difference or differential between adjacent rows on the image) may be computed at every time sample from the closest two data points (e.g., adjacent rows/depths in the image). Based on the depth variation (difference) and current maximum depth, the tool status may be identified according to one or both of the following flags (Flag1 and/or Flag2):

$$\text{Flag1} = \begin{cases} 0, & dD_i > 0 \\ 1, & dD_i = 0 \\ 2, & dD_i < 0 \end{cases}$$

$$\text{Flag2} = \begin{cases} 0, & D_i > D_m \\ 1, & D_i = D_m \\ 2, & D_i < D_m \end{cases}$$

where $D_i$ represents the current depth (at depth or row i), $dD_i$ represents the depth variation or difference between adjacent image rows in the time domain (e.g., $D_i-D_{i-1}$), and $D_m$ represents the current maximum depth in the time domain. A drilling ahead interval may be identified, for example, when the first flag Flag1 and/or the second flag Flag2 is equal to zero (0) ($dD_i>0$ and/or $D_i>D_m$). The current depth may then replace the maximum depth for the next iteration. A tool pullout or tripping interval may be identified when the first flag and/or the second flag is equal to two (2) ($dD_i<0$ and/or $D_i<D_m$). A stop interval may be identified, for example, when the first flag is equal to one (1) ($dD_i=0$) and/or when the second flag is equal to one (1) or two (2) ($D_i \leq D_m$).

Image similarity may be computed at 106, for example, via computing a correlation coefficient between consecutive rows in the image. The correlation coefficient may be computed, for example, using the following equation:

$$R_{ij} = \frac{C_{ij}}{\sqrt{C_{ii} * C_{jj}}}$$

where $R_{ij}$ represents the correlation coefficient, $C_{ij}$ represents the covariance of two lines of image data, and $C_{ii}$ and $C_{jj}$ represent the self-covariances of two lines of image data. The value at $R_{0,1}$ is selected as the maximum correlation coefficient and its value range is between [−1,1]. The higher the value, the more similar the two rows. The correlation coefficient of the image during connection breakdown time may be almost equal to 1. The value may also be much closer to 1 in a stick slip interval than when the tool is drilling down under normal drilling conditions. Therefore, the tool stop intervals may be identified when the correlation coefficient of adjacent images is greater than a threshold value, such as 0.7, 0.8, or even 0.9. It will be appreciated that the disclosed embodiments are not limited to any particular correlation coefficient computation (equation) or to any particular coefficient threshold.

An artificial intelligence (AI) based solution may also be utilized to identify stop intervals in the image data. In one example implementation, deep learning image classifiers may be trained to identify the distinctive patterns of image areas associated with a stop interval (such as vertically repeated image patterns or distinctive artifacts). Moreover, since the images tend to be similar during a non-rotation time and/or stop intervals, the training database may be built efficiently with a limited data set. The result of an AI inference may be cross-checked with the result of image similarity computation for redundancy and robustness. A final decision on whether an image area belongs to a stop interval (e.g., a pipe connection) may be based on image similarity, AI, or a combination of both methods. The use of an AI routine is shown in FIG. 3 at 107 in parallel with the correlation coefficient computation, although it will be appreciated that in example embodiments either or both of the correlation 106 and AI 107 methods may be employed.

With continued reference to FIGS. 2 and 3, the surface depth and image depth may be synchronized via shifting and rescaling the tool stop intervals computed from the surface depth measurements and from the image data as described above (since they are generally offset or do not match perfectly). These differences may be explained from the motion profile of the tool downhole differing from the depth measurements made at the surface (e.g., via movement of the traveling block). To resynchronize both, surface depth time interval may be shifted and rescaled to match the downhole time interval (downscaled when its time length is shorter than the downhole time interval or upscaled otherwise). One example of this shifting and scaling may be accomplished as follows:

$$Doutput_i = Dinput_k * (1 - (j - k)) + Dinput_{k+1} * (j - k)$$

$$i \in [0, N_{output}]$$

$$j = \frac{N_{input}}{N_{output}} * i$$

$$k = \lfloor j \rfloor$$

where $Doutput_i$ represents the rescaled surface depth to image validated interval, $Dinput_k$ represents the original surface depth in the time domain, $N_{input}$ represents the surface depth number in a particular certain interval, and $N_{output}$ represents the rescaled surface depth number in the certain interval. It will be appreciated that after the surface depth shifting and re-computation, the relative varied logging speed is advantageously maintained.

Stick slip mode may be identified (e.g., at 112) by evaluating the interpolated depths. For example, stick slip mode may be identified when the interpolated depth variation (between adjacent depths) is greater than a predetermined threshold (such as the depth resolution of the image). It has been found that stick slip features may be clearly observed on LWD images when the depth variation exceeds the vertical resolution of the image. It will be appreciated that the vertical resolution of the image (and therefore the selected threshold) may vary depending on the geometry of the logging sensor (e.g., the sensor size), the logging data sampling rate, and the drilling rate of penetration. For example, for ultrasonic images, the vertical resolution of the image (and therefore the threshold) may be on the order of one to three centimeters. Of course, the disclosed embodiments are not limited to any particular threshold.

Stick slip mode may be alternatively and/or additionally identified by evaluating the image using a trained AI NN. The NN may be trained, for example, using images having known stick slip features. In one example embodiment, the NN may be trained using images in which stick slip features have been identified using an interpolated depth variation that exceeds a predetermined threshold such as a vertical resolution of the image.

To remove stick slip features, the image depths may be resampled, for example, via averaging (such as a moving average) or via filtering, in the vicinity of (or in a depth window about) each of the stick slip depth(s). In one example embodiment, each of the depths in the depth window may be resampled to thereby remove the stick slip feature from the image. In this example embodiment, the rate of penetration of drilling is assumed to be constant in the depth window about the stick slip depth (e.g., including 7, 9, 11, 13, or 15 depths). The window depths may be resampled such that depths are uniformly incremented in the window from one line or depth in the image to the next.

The above described depth resampling may be expressed mathematically, for example, as follows:

$$\Delta D = \frac{(D_{i+n} - D_{i-n})}{2n};$$

$$D_1 = D_{i-n};$$

$$D_2 = D_{i-n} + \Delta D;$$

$$\vdots$$

$$D_i = D_{i-n} + n\Delta D;$$

$$\vdots$$

$$D_{2n} = D_{i-n} + (2n - 1)\Delta D;$$

$$D_{2n+1} = D_{i-n} + 2n\Delta D = D_{i+n}$$

where $\Delta D$ represents a depth increment in the depth window about the stick slip depth, n represents the number of depths in the window above and below the stick slip depth (e.g., 3, 4, 5, 6, 7, etc.) such that the window includes 2n+1 depths and extends from depth $D_{i-n}$ to depth $D_{i+n}$, $D_i$ represents the stick slip depth (located at the center of the depth window in this example), and $D_1$, $D_2$, etc. represent the first, second, etc. depths in the depth window.

Figure 4:
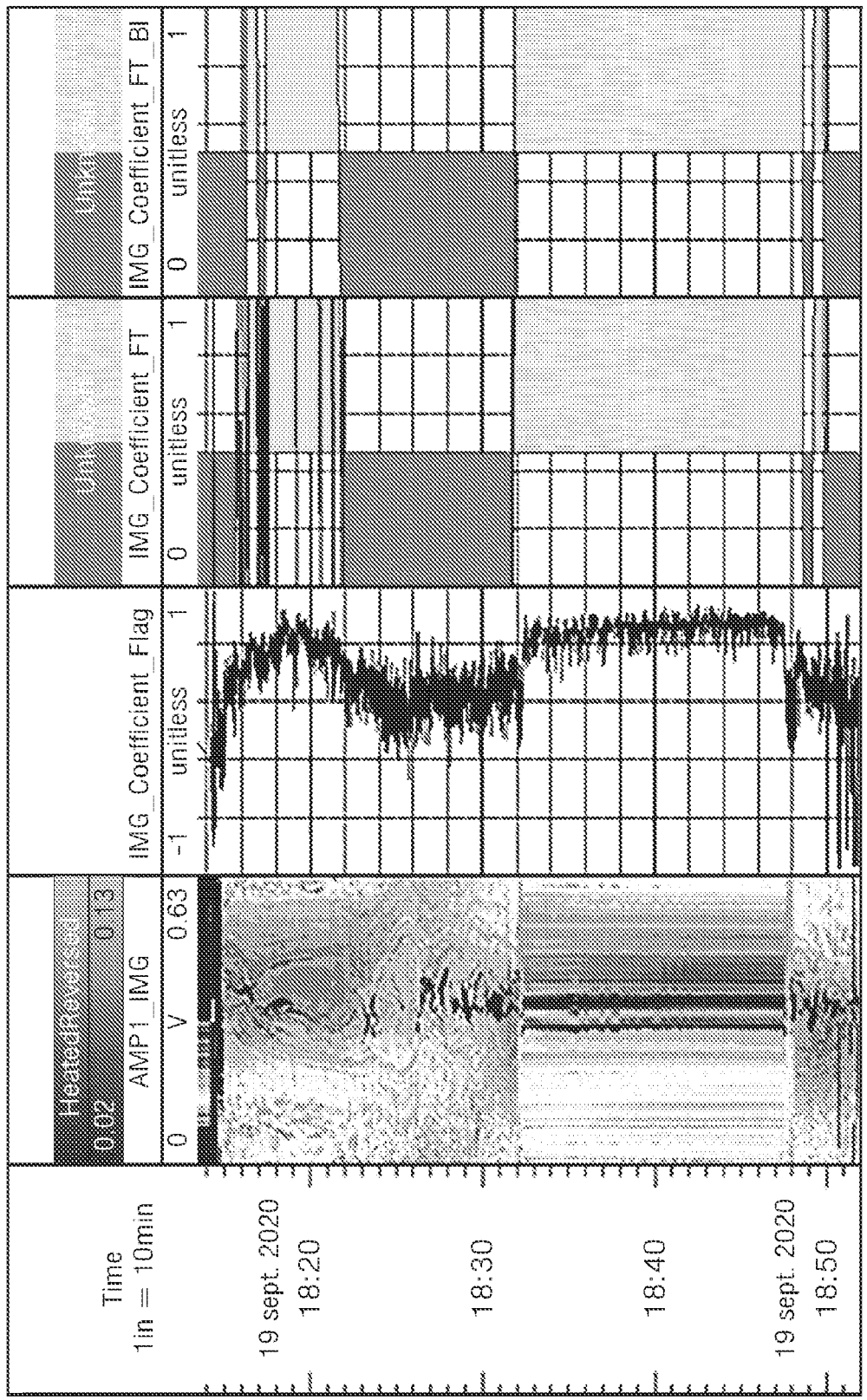
FIG. 4 depicts an example log in which image similarity and tool status identification is determined from LWD ultrasonic image data.

The methodology disclosed in FIGS. 2 and 3 is now described in further detail by way of the following nonlimiting examples. FIG. 4 depicts an example log in which image similarity and tool status identification is determined from LWD ultrasonic image data (e.g., as described above with respect to elements 106 and 108 of FIGS. 2 and 3). In FIG. 4 the log tracks are referenced from left to right. Track 1 is a time index (in 24 hour time). Track 2 is an LWD ultrasonic image. Track 3 is a computed image correlation coefficient. Track 4 is a tool stop or connection breakdown flag. And track 5 is a filtered tool status flag. Note that the region from a time of about 18:32 to about 18:48 having a very high correlation coefficient (consistently greater than 0.8) is indicative of a tool stop interval. The region from a time of about 18:16 to about 18:22 having a high correlation coefficient may also be indicative of a tool stop interval.

Figure 5:
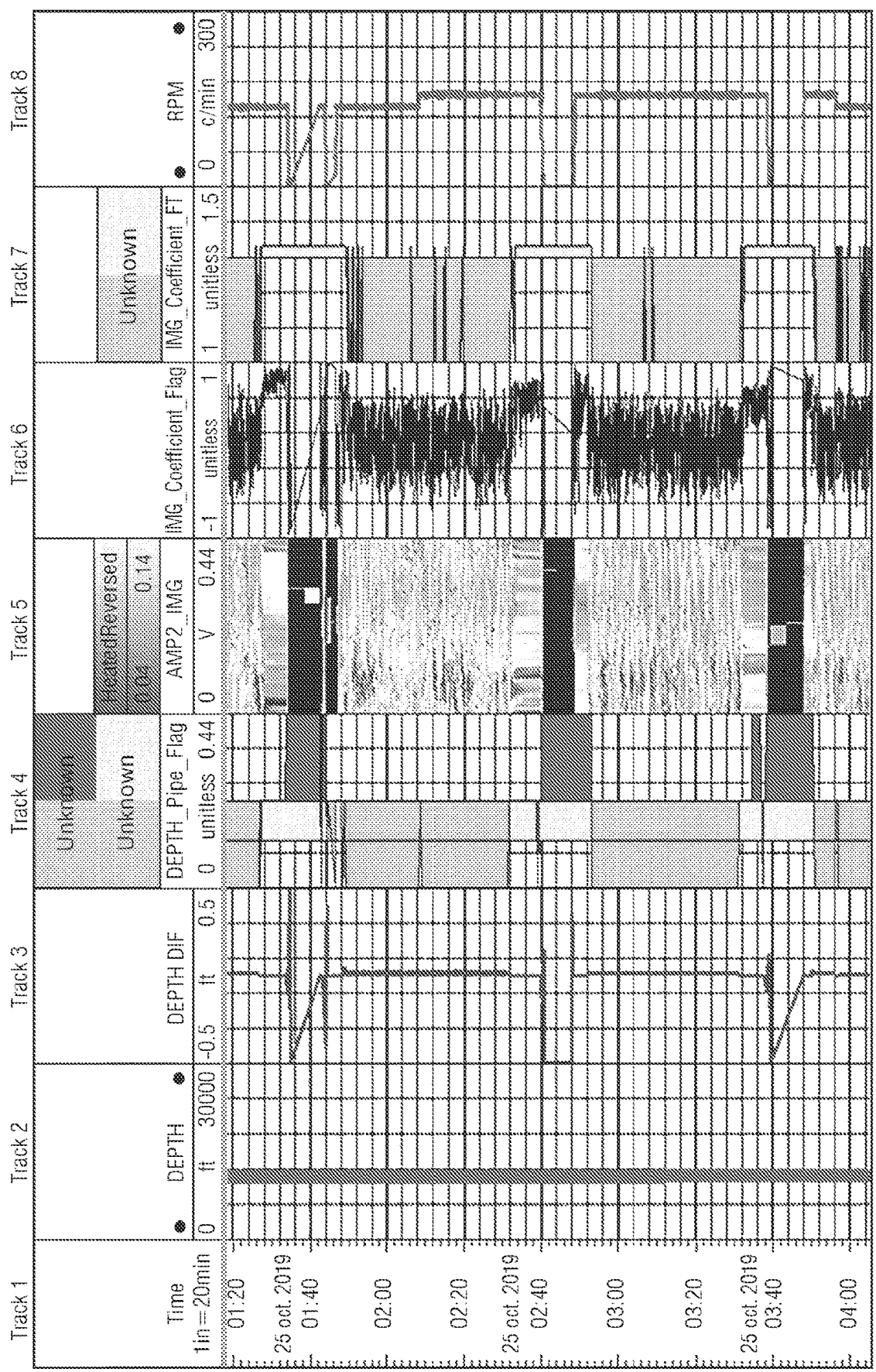
FIG. 5 depicts another example log in which the tool status identification is determined from both the surface depth data and LWD image data.

FIG. 5 depicts another example log in which the tool status identification is determined from both the surface depth data and LWD image data (e.g., as described above with respect to elements 102, 104, and 106, 108 of FIGS. 2 and 3). In FIG. 5, track 1 is a time index (from about 1:20 to about 4:00). Track 2 shows the interpolated surface depth obtained at 102. Track 3 plots surface depth differences obtained from adjacent interpolated depths ($ID_i$-$ID_{i-1}$). Track 4 shows a tool status flag identified at 104 based on the surface depth difference (with light grey representing drilling down, moderate grey representing tool stop, and dark grey representing lifting or pulling out). Track 5 depicts the downhole image data. Track 6 shows the correlation coefficient computed from the image data at 106. Track 7 shows a tool status flag identified from the correlation coefficient at 108 (with light grey representing drilling down and moderate grey representing tool stop or lifting). Track 8 is the drill string rotation rate in revolutions per minute (RPM).

Figure 6:
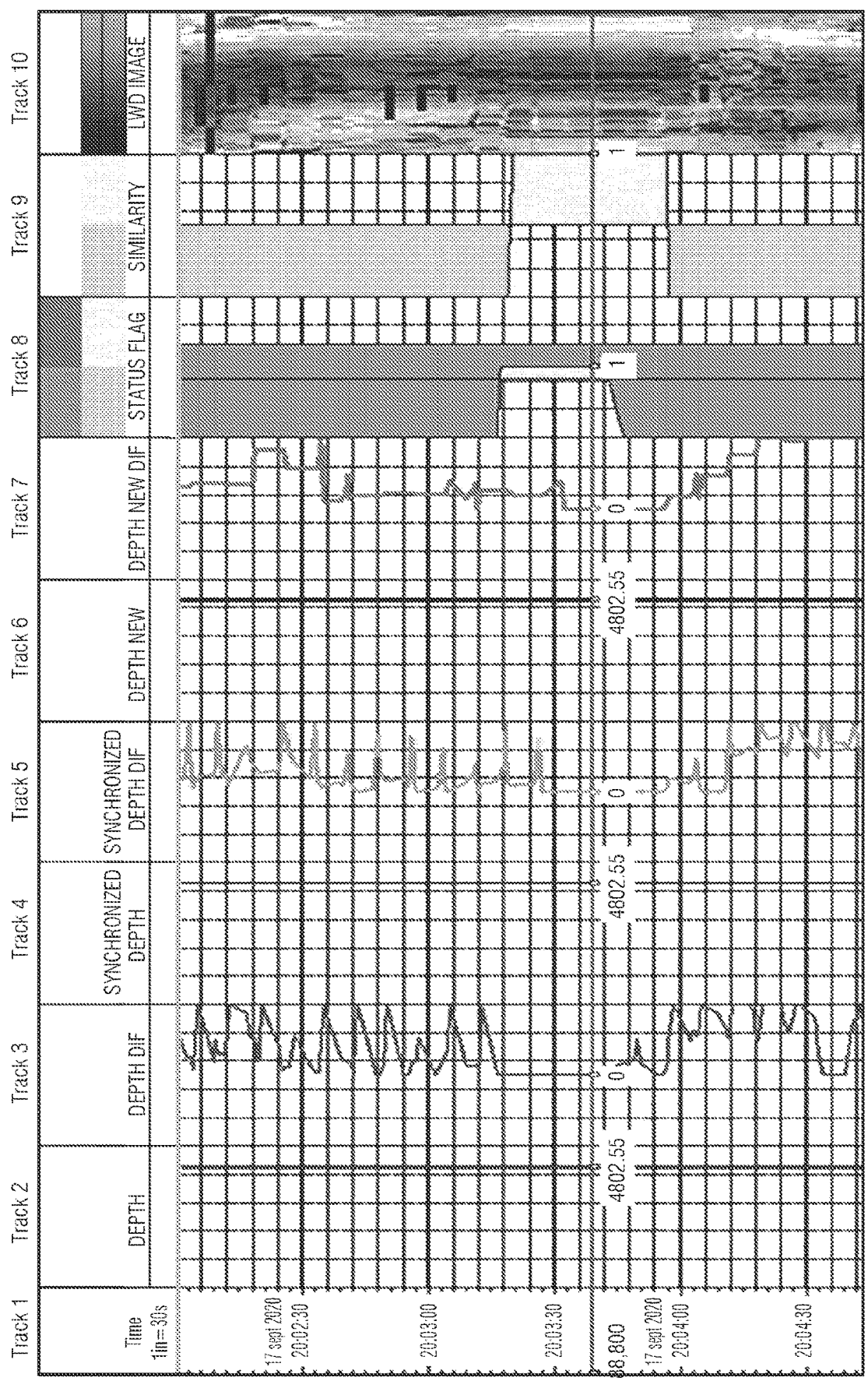
FIG. 6 depicts another example log demonstrating the synchronization via scaling and shifting and the surface depth resampling.

FIG. 6 depicts another log example demonstrating the synchronization via scaling and shifting at 110 and a surface depth resampling at 112 of FIGS. 2 and 3. Track 1 is a time index (from about 20:02:00 to about 20:04:40). Track 2 shows the interpolated surface depth obtained at 102. Track 3 plots surface depth differences obtained from adjacent interpolated depths. Track 4 shows the synchronized surface depth (shifted and re-scaled as described above) obtained at 110. Track 5 plots depth differences obtained from adjacent synchronized surface depth values ($SD_i$-$SD_{i-1}$). Track 6 shows the resampled surface depth values obtained at 112. Track 7 plots depth differences obtained from adjacent resampled surface depth values ($RSD_i$-$RSD_{i-1}$). Tracks 8 and 9 show tool status flags obtained from the interpolated surface depth differences and the image similarity (correlation). Track 10 depicts the original LWD image data. Note that tracks 3 and 5 further depict the rapidly increasing and decreasing rate of penetration (depth differences) commonly associated with stick slip conditions (e.g., while drilling in the one minute time interval from 22:02:30 to 22:03:30).

As noted above, AI routines may also be advantageously utilized to make or aid in the tool status identification (e.g., to provide a redundant measure for tool status identification or even to provide the primary tool status identification). In such embodiments substantially any suitable deep learning architecture or method tailored for image anomaly detection, image classification, or pattern recognition may be utilized.

In one example implementation, a deep learning convolutional neural network (CNN) for general purpose multiclass image classification was used (SqueezeNet which was developed at the University of California and released in 2016). The training model was built on a limited pool of labeled sample image data including two labels; stop interval and drilling. The model was then used to infer the class of samples in an unseen LWD image to determine (label) drilling and stop intervals in the image. The deep learning algorithm was tested on both resistivity and ultrasonic images.

Figure 7:
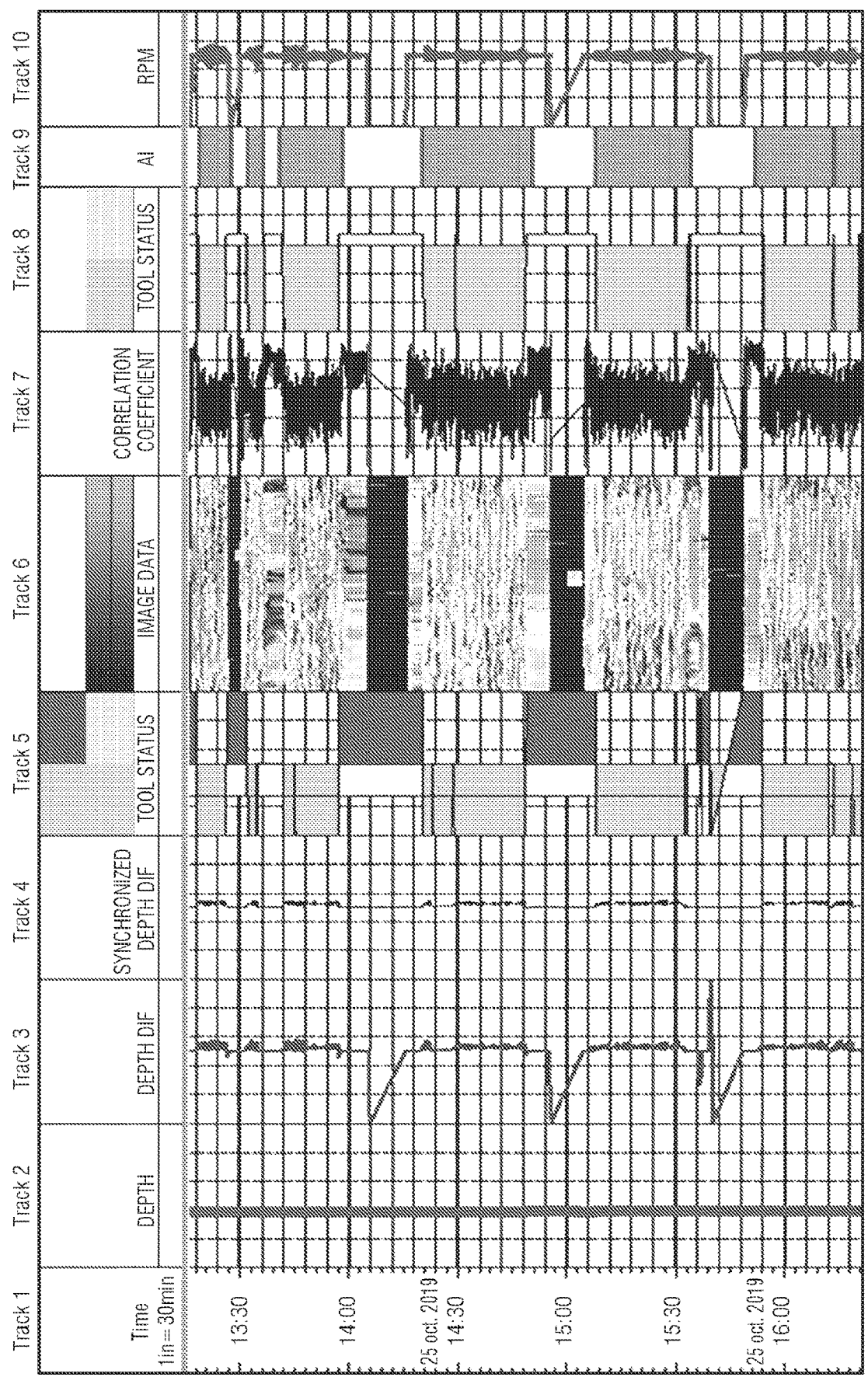
FIG. 7 depicts an example log in which the tool status identification is determined from the image data using both the computed similarity values and a neural network AI routine.

FIG. 7 depicts an example log in which the tool status identification is determined from the image data using both the computed similarity values and the AI routine. Track 1 is a time index (from about 13:26 to about 16:26). Track 2 shows the interpolated surface depth. Track 3 shows the surface depth differences from adjacent depths. Track 4, shows depth differences between adjacent depths after shifting, scaling, and smoothing (or averaging). Track 5 shows the identified tool status from the surface depth differences in track 3 (with light grey representing drilling down, moderate grey representing tool stop, and dark grey representing lifting or pulling out). Track 6 shows the downhole image data. Track 7 shows the computed correlation coefficient from the image data. Track 8 shows the identified tool status from the correlation coefficient (in grey scale as described above). Track 9 shows the identified tool status using AI. Track 10 shows drill string RPM. Note that the identified tool status using AI is very similar (essentially identical) to the status identified using image correlation (similarity).

One advantage of using AI is that the distinctive nature of the observed images when the tool is stopped makes tool stop interval detection straightforward with limited training data and no particular thresholding. The use of AI may therefore be more user friendly in certain operations or with certain image types. The tool statuses identified from the image with the AI solution were essentially the same as those obtained with the computed image similarity (over most time intervals). The result from the AI solution for the slip features may be particularly advantageous in homogeneous formations where image similarity might always be high (irrespective of whether or not the tool is stopped). Increasing the size of the training data set may also provide improved AI results. Moreover, the window size used for image labeling and classification may be selected carefully since it can be difficult to identify the boundary from the slip image features caused by gradually slowdown of tool rotation.

Figure 8:
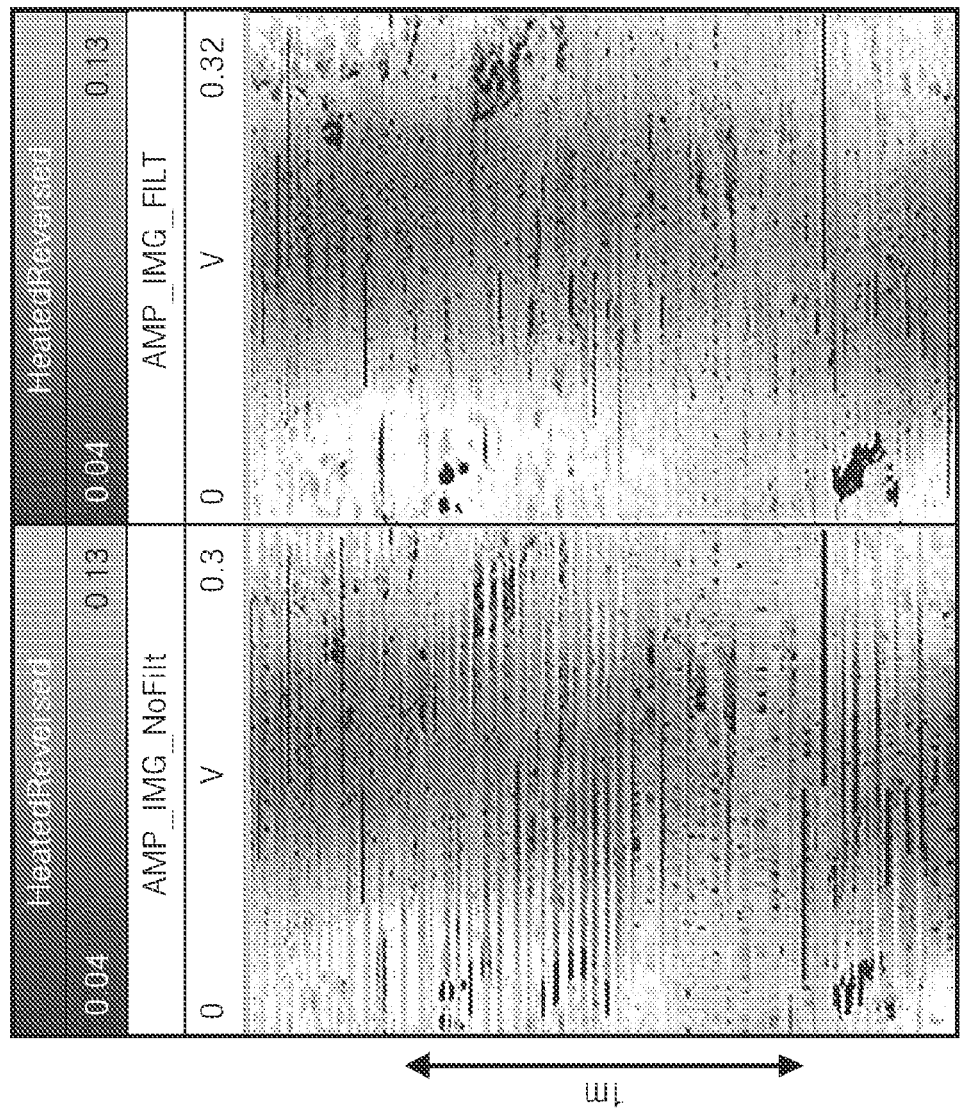
FIG. 8 depicts original versus stick slip corrected LWD images.

FIG. 8 depicts original versus stick slip corrected LWD images. The original image is shown on the left while the stick slip corrected image is shown on the right. Note the reduction in horizontal stick slip features (the dark horizontal bands in the left image). Removal of these stick slip features is seen to significantly improve image quality and may better enable image features to be identified and evaluated.

It will be appreciated that the disclosed embodiments may further include a system for correcting an LWD image to remove stick slip features. Such a system may include computer hardware and software configured to process the LWD image to remove the stick slip features (e.g., as described above with respect to FIG. 1). The hardware may include one or more processors (e.g., microprocessors) which may be connected to one data storage devices (e.g., hard drives or solid state memory) and user interfaces. The hardware and software configured may be configured to correct the LWD images automatically or semi-automatically (e.g., in tandem with operator input and guidance). It will be further understood that the disclosed embodiments may include processor executable instructions stored in the data storage device. The disclosed embodiments are, of course, not limited to the use of or the configuration of any particular computer hardware and/or software.

It will be understood that the present disclosure includes numerous embodiments. These embodiments include, but are not limited to, the following embodiments.

In a first embodiment, a method for correcting an LWD image to remove stick slip features includes obtaining an LWD image in a wellbore, the LWD image including a two-dimensional representation of LWD measurements at discrete azimuthal angles and depths in the wellbore; interpolating surface depth measurements to obtain interpolated surface depths at selected ones of the depths in the LWD image; evaluating the interpolated surface depths to obtain a first tool status log; evaluating the LWD image to obtain a second tool status log; synchronizing the first tool status log and the second tool status log to obtain a synchronized log; identifying a depth of a stick slip feature in the LWD image; and resampling the interpolated surface depths to remove the stick slip feature from the LWD image and obtain a stick slip corrected LWD image.

A second embodiment may include the first embodiment, wherein the obtaining an LWD image comprises rotating an LWD tool in a wellbore using the LWD tool to make LWD measurements while rotating; and generating the LWD image from the LWD measurements.

A third embodiment may include any one of the first through second embodiments, wherein the LWD measurements comprise ultrasonic measurements or resistivity measurements.

A fourth embodiment may include any one of the first through third embodiments, wherein the evaluating the interpolated surface depths to obtain the first tool status log comprises identifying a tool stop interval when a depth change between adjacent ones of the interpolated surface depths is less than a predetermined threshold or when the interpolated surface depths are less than a maximum drilling depth.

A fifth embodiment may include any one of the first through fourth embodiments, wherein the evaluating the LWD image to identify the second tool status log comprises at least one of the following computing a correlation between adjacent depths in the LWD image and identifying a tool stop interval when the computed correlation exceeds a predetermined threshold; and evaluating the LWD image with a trained neural network to label at least one tool stop interval, wherein the trained neural network is trained using a plurality of image samples including at least first and second tool status categories.

A sixth embodiment may include any one of the first through fifth embodiments, wherein the synchronizing comprises shifting and rescaling tool stop intervals in the first tool status log and tool stop intervals in the second tool status log such that the first tool status log matches the second tool status log.

A seventh embodiment may include any one of the first through sixth embodiments, wherein the identifying the depth of the stick slip feature comprises at least one of the following identifying a depth at which a depth change between adjacent ones of the interpolated surface depths is greater than a predetermined threshold; and evaluating the LWD image with a trained neural network to identify the stick slip feature and the corresponding depth.

An eight embodiment may include the seventh embodiment, wherein the predetermined threshold is a vertical resolution of the LWD image.

A ninth embodiment may include any one of the first through eighth embodiments, wherein the resampling the interpolated surface depths comprises uniformly incrementing the interpolated depths in a depth window about the depth of the stick slip feature.

A tenth embodiment may include the ninth embodiment, wherein the depth window comprises from 7 to 15 of the interpolated depths.

In an eleventh embodiment, a system for correcting an LWD image to remove stick slip features includes a logging while drilling tool configured to obtain an LWD image of a wellbore, the LWD image including a two-dimensional representation of LWD measurements at discrete azimuthal angles and depths in a wellbore; and at least one computer processor configured to interpolate surface depth measurements to obtain interpolated surface depths at selected ones of the depths in the LWD image; evaluate the interpolated surface depths to obtain a first tool status log; evaluate the LWD image to obtain a second tool status log; synchronize the first tool status log and the second tool status log to obtain a synchronized log; identify a depth of a stick slip feature in the LWD image; and resample the interpolated surface depths to remove the stick slip feature from the LWD image and obtain a stick slip corrected LWD image.

A twelfth embodiment may include the eleventh embodiment, wherein the LWD tool is configured to make ultrasonic measurements or resistivity measurements.

A thirteenth embodiment may include any one of the eleventh through twelfth embodiments, wherein the evaluate the interpolated surface depths to obtain the first tool status log comprises identifying a tool stop interval when a depth change between adjacent ones of the interpolated surface depths is less than a predetermined threshold or when the interpolated surface depths are less than a maximum drilling depth.

A fourteenth embodiment may include any one of the eleventh through thirteenth embodiments, wherein the evaluate the LWD image to identify the second tool status log comprises at least one of the following compute a correlation between adjacent depths in the LWD image and identifying a tool stop interval when the computed correlation exceeds a predetermined threshold; and evaluate the LWD image with a trained neural network to label at least one tool stop interval, wherein the trained neural network is trained using a plurality of image samples including at least first and second tool status categories.

A fifteenth embodiment may include any one of the eleventh through fourteenth embodiments, wherein the resample the interpolated surface depths comprises uniformly incrementing the interpolated depths in a depth window about the depth of the stick slip feature in which the depth window comprises from 7 to 15 of the interpolated depths.

In a sixteenth embodiment, a method for making stick slip corrected LWD imaging measurements includes conveying a LWD tool in a wellbore; using the LWD tool to measure an LWD image while conveying, the LWD image including a two-dimensional representation of LWD measurements at discrete azimuthal angles and depths in the wellbore; interpolating surface depth measurements made while measuring the LWD image to obtain interpolated surface depths at selected ones of the depths in the LWD image; evaluating the interpolated surface depths to identify first tool stop intervals while conveying the LWD tool; evaluating the LWD image to identify second tool stop intervals; shifting and rescaling the first tool stop intervals and the second tool stop intervals to generate synchronized tool stop intervals; identifying a depth of a stick slip feature in the LWD image; and resampling the interpolated surface depths to remove the stick slip feature from the LWD image and obtain a stick slip corrected LWD image.

A seventeenth embodiment may include the sixteenth embodiment, wherein the evaluating the interpolated surface depths to identify the first tool stop intervals comprises identifying the first tool stop interval when a depth change between adjacent ones of the interpolated surface depths is less than a predetermined threshold or when the interpolated surface depths are less than a maximum drilling depth.

An eighteenth embodiment may include any one of the sixteenth through seventeenth embodiments, wherein the evaluating the LWD image to identify the second tool stop intervals comprises at least one of the following computing a correlation between adjacent depths in the LWD image and identifying the second tool stop intervals when the computed correlation exceeds a predetermined threshold; and evaluating the LWD image with a trained neural network to label the second tool stop intervals, wherein the trained neural network is trained using a plurality of image samples including at least first and second tool status categories.

A nineteenth embodiment may include any one of the sixteenth through eighteenth embodiments, wherein the evaluating the interpolated surface depths to identify the stick slip feature comprises identifying the stick slip feature when a depth change between adjacent ones of the interpolated surface depths is greater than a predetermined threshold.

A twentieth embodiment may include any one of the sixteenth through nineteenth embodiments, wherein the identifying the depth of the stick slip feature comprises at least one of the following (i) identifying a depth at which a depth change between adjacent ones of the interpolated surface depths is greater than a predetermined threshold; and (ii) evaluating the LWD image with a trained neural network to identify the stick slip feature and the corresponding depth; and the resampling the interpolated surface depths comprises uniformly incrementing the interpolated depths in a depth window about the depth of the stick slip feature.

Although image based stick slip correction of logging while drilling images has been described in detail, it should be understood that various changes, substitutions and alternations can be made herein without departing from the spirit and scope of the disclosure as defined by the appended claims.

We claim:

1. A method for correcting a logging while drilling (LWD) image to remove stick slip features, the method comprising:
   obtaining an LWD image in a wellbore, the LWD image including a two-dimensional representation of LWD measurements at discrete azimuthal angles and one or more depths in the wellbore;
   acquiring surface depth measurements at one or more time intervals from a depth measurement module at the surface;
   interpolating surface depth measurements to obtain interpolated surface depths at a selected depth of the one or more depths in the LWD image;
   evaluating the interpolated surface depths to obtain a first tool status log, wherein the first tool status log includes surface depth tool stop intervals;
   evaluating the LWD image to obtain a second tool status log, wherein the second tool status log includes image depth tool stop intervals;
   synchronizing the first tool status log and the second tool status log to obtain a synchronized log based on the surface depth tool stop intervals and the image depth tool stop intervals;
   identifying a depth of a stick slip feature in the LWD image; and
   resampling the interpolated surface depths to remove the stick slip feature from the LWD image and obtain a stick slip corrected LWD image.

2. The method of claim 1, wherein the obtaining the LWD image comprises:
   rotating an LWD tool in the wellbore;
   using the LWD tool to make LWD measurements while rotating; and
   generating the LWD image from the LWD measurements.

3. The method of claim 1, wherein the LWD measurements comprise ultrasonic measurements or resistivity measurements.

4. The method of claim 1, wherein the evaluating the interpolated surface depths to obtain the first tool status log comprises identifying the surface depth tool stop intervals when a depth change between adjacent ones of the interpolated surface depths is less than a predetermined threshold or when the interpolated surface depths are less than a maximum drilling depth.

5. The method of claim 1, wherein the evaluating the LWD image to identify the second tool status log comprises at least one of the following:
   computing a correlation between adjacent depths in the LWD image and identifying the image depth tool stop intervals when the computed correlation exceeds a predetermined threshold; and
   evaluating the LWD image with a trained neural network to label at least one of the image depth tool stop intervals, wherein the trained neural network is trained using a plurality of image samples including at least a first tool status category and a second tool status category.

6. The method of claim 1, wherein the synchronizing comprises shifting and rescaling the surface depth tool stop intervals in the first tool status log and the image depth tool stop intervals in the second tool status log such that the first tool status log matches the second tool status log.

7. The method of claim 1, wherein the identifying the depth of the stick slip feature comprises at least one of the following:
   identifying a depth at which a depth change between adjacent depths of the interpolated surface depths is greater than a predetermined threshold; and
   evaluating the LWD image with a trained neural network to identify the stick slip feature and the corresponding depth.

8. The method of claim 7, wherein the predetermined threshold is a vertical resolution of the LWD image.

9. The method of claim 1, wherein the resampling the interpolated surface depths comprises uniformly incrementing the interpolated depths in a depth window about the depth of the stick slip feature.

10. The method of claim 9, wherein the depth window comprises from 7 to 15 of the interpolated depths.

11. A system for correcting a logging while drilling (LWD) image to remove stick slip features, the system comprising:
    a LWD tool configured to obtain an LWD image of a wellbore, the LWD image including a two-dimensional representation of LWD measurements at discrete azimuthal angles and one or more depths in the wellbore; and
    at least one computer processor configured to:
        acquire surface depth measurements at one or more time intervals from a depth measurement module at the surface;

interpolate surface depth measurements to obtain interpolated surface depths at a selected depth of the one or more depths in the LWD image;
evaluate the interpolated surface depths to obtain a first tool status log, wherein the first tool status log includes surface depth tool stop intervals;
evaluate the LWD image to obtain a second tool status log, wherein the second tool status log includes image depth tool stop intervals;
synchronize the first tool status log and the second tool status log to obtain a synchronized log based on the surface depth tool stop intervals and the image depth tool stop intervals;
identify a depth of a stick slip feature in the LWD image; and
resample the interpolated surface depths to remove the stick slip feature from the LWD image and obtain a stick slip corrected LWD image.

12. The system of claim 11, wherein the LWD tool is configured to make ultrasonic measurements or resistivity measurements.

13. The system of claim 11, wherein the evaluate the interpolated surface depths to obtain the first tool status log comprises identifying the surface depth tool stop interval when a depth change between adjacent ones of the interpolated surface depths is less than a predetermined threshold or when the interpolated surface depths are less than a maximum drilling depth.

14. The system of claim 11, wherein the evaluate the LWD image to identify the second tool status log comprises at least one of the following:
compute a correlation between adjacent depths in the LWD image and identifying the image depth tool stop intervals when the computed correlation exceeds a predetermined threshold; and
evaluate the LWD image with a trained neural network to label at least one of the image depth tool stop intervals, wherein the trained neural network is trained using a plurality of image samples including at least a first tool status category and a second tool status category.

15. The system of claim 11, wherein the resample the interpolated surface depths comprises uniformly incrementing the interpolated depths in a depth window about the depth of the stick slip feature in which the depth window comprises from 7 to 15 of the interpolated depths.

16. A method for making stick slip corrected logging while drilling (LWD) imaging measurements, the method comprising:
conveying a LWD tool in a wellbore;
using the LWD tool to measure an LWD image while conveying, the LWD image including a two-dimensional representation of LWD measurements at discrete azimuthal angles and one or more depths in the wellbore;
acquiring surface depth measurements at one or more time intervals from a depth measurement module at the surface;
interpolating surface depth measurements made while measuring the LWD image to obtain interpolated surface depths at a selected depth of the one or more depths in the LWD image;
evaluating the interpolated surface depths to identify surface depth tool stop intervals while conveying the LWD tool;
evaluating the LWD image to identify image depth tool stop intervals;
shifting and rescaling the surface depth tool stop intervals and the image depth tool stop intervals to generate synchronized tool stop intervals;
identifying a depth of a stick slip feature in the LWD image; and
resampling the interpolated surface depths to remove the stick slip feature from the LWD image and obtain a stick slip corrected LWD image.

17. The method of claim 16, wherein the evaluating the interpolated surface depths to identify the surface depth tool stop intervals comprises identifying the surface depth tool stop intervals when a depth change between adjacent ones of the interpolated surface depths is less than a predetermined threshold or when the interpolated surface depths are less than a maximum drilling depth.

18. The method of claim 16, wherein the evaluating the LWD image to identify the image depth tool stop intervals comprises at least one of the following:
computing a correlation between adjacent depths in the LWD image and identifying the image depth tool stop intervals when the computed correlation exceeds a predetermined threshold; and
evaluating the LWD image with a trained neural network to label the image depth tool stop intervals, wherein the trained neural network is trained using a plurality of image samples including at least a first tool status category and a second tool status category.

19. The method of claim 16, wherein the evaluating the interpolated surface depths to identify the stick slip feature comprises identifying the stick slip feature when a depth change between adjacent depths of the interpolated surface depths is greater than a predetermined threshold.

20. The method of claim 16, wherein:
the identifying the depth of the stick slip feature comprises at least one of the following: (i) identifying a depth at which a depth change between adjacent ones of the interpolated surface depths is greater than a predetermined threshold; and (ii) evaluating the LWD image with a trained neural network to identify the stick slip feature and the corresponding depth; and
the resampling the interpolated surface depths comprises uniformly incrementing the interpolated depths in a depth window about the depth of the stick slip feature.

* * * * *